(12) United States Patent
Yu

(10) Patent No.: US 9,099,021 B2
(45) Date of Patent: Aug. 4, 2015

(54) DISPLAY SCREEN AND TERMINAL DEVICE USING SAME

(75) Inventor: Zhou Yu, Beijing (CN)

(73) Assignees: BEIJING LENOVO SOFTWARE LTD., Haidian District, Beijing (CN); LENOVO (BEIJING) CO., LTD., Haidian District, Beijing (CN)

(*) Notice: Subject to any disclaimer, the term of this patent is extended or adjusted under 35 U.S.C. 154(b) by 211 days.

(21) Appl. No.: 13/812,635

(22) PCT Filed: Jul. 29, 2011

(86) PCT No.: PCT/CN2011/077791
§ 371 (c)(1),
(2), (4) Date: Feb. 27, 2013

(87) PCT Pub. No.: WO2012/013156
PCT Pub. Date: Feb. 2, 2012

(65) Prior Publication Data
US 2013/0207952 A1    Aug. 15, 2013

(30) Foreign Application Priority Data

Jul. 30, 2010 (CN) .......................... 2010 1 0242747
Sep. 6, 2010 (CN) .......................... 2010 1 0274331

(51) Int. Cl.
*G09G 5/00* (2006.01)
*G03B 17/48* (2006.01)
(Continued)

(52) U.S. Cl.
CPC ................ *G09G 5/003* (2013.01); *G03B 17/48* (2013.01); *G03B 29/00* (2013.01); *H04M 1/0202* (2013.01); *H04M 1/0264* (2013.01); *H04M 1/0266* (2013.01); *H04N 7/18* (2013.01)

(58) Field of Classification Search
CPC ....... G09G 3/3406; G09G 5/026; G09G 5/03; G09G 2630/14; G09G 2630/145; H04N 5/335; H04N 7/18
USPC .............................................. 345/87, 10, 690
See application file for complete search history.

(56) References Cited

U.S. PATENT DOCUMENTS 5,340,978 A    8/1994 Rostoker et al.
5,760,834 A *  6/1998 Rostoker
(Continued)

FOREIGN PATENT DOCUMENTS

CN    1591891    3/2005
CN    1808222    7/2006
(Continued)

OTHER PUBLICATIONS

First Office Action dated Jan. 11, 2013 of corresponding Chinese priority application 201010242747.X (12 pages including English translation).
(Continued)

*Primary Examiner* — Regina Liang
(74) *Attorney, Agent, or Firm* — Brinks Gilson & Lione; G. Peter Nichols

(57) ABSTRACT

A display screen, terminal device using same and method for controlling same are described. The display screen includes a display panel portion configured to display an image based on inputted image data; a transparent fixing component, which is located above the display panel portion, configured to protect the display panel portion; and a camera unit provided on a first area of the display panel portion. By way of the above configuration, a user looks directly at the display screen during a video call or video chat. In this way, the user looks directly at the camera component which takes a video of the user, so that the users participating in the video call feel they are achieving eye contact, thus enhancing the experience of video calls and chats.

21 Claims, 5 Drawing Sheets

(51) Int. Cl.
  *G03B 29/00* (2006.01)
  *H04N 7/18* (2006.01)
  *H04M 1/02* (2006.01)

(56) References Cited

U.S. PATENT DOCUMENTS

| | | |
|---|---|---|
| 7,522,230 B2 | 4/2009 | Lee |
| 7,653,266 B2 * | 1/2010 | Nakayama et al. |
| 7,701,530 B2 | 4/2010 | Lee |
| 2005/0264689 A1 | 12/2005 | Yang et al. |
| 2007/0079537 A1 | 4/2007 | Lee |
| 2009/0102763 A1 | 4/2009 | Border et al. |
| 2009/0180051 A1 | 7/2009 | Lee |

FOREIGN PATENT DOCUMENTS

| | | |
|---|---|---|
| CN | 1873741 | 12/2006 |
| CN | 1940660 | 4/2007 |
| CN | 101119435 | 2/2008 |
| CN | 101149521 | 3/2008 |
| CN | 101697563 | 4/2010 |
| CN | 101815964 | 8/2010 |
| JP | 4150683 | 5/1992 |
| JP | 2859416 | 2/1999 |
| JP | 2004357140 | 12/2004 |
| JP | 2006340244 | 12/2006 |

OTHER PUBLICATIONS

PCT/CN2011/077791 International Preliminary Report on Patentability dated Feb. 5, 2013 (23 pages).
First Office Action dated Apr. 24, 2013 of corresponding Chinese priority application 201010274331.6 (13 pages including English translation).
PCT/CN2011/077791 International Search Report dated Nov. 3, 2011 (4 pages).
Second Office Action dated Sep. 23, 2013 in corresponding Chinese application No. 201010242747X (13 pages including English translation).
Second Office Action dated Dec. 27, 2013 of corresponding Chinese priority application 201010274331.6 (11 pages including English translation).
Chinese Reexamination Notification with English Translation for related Application No. 201010274331.6 dated Apr. 16, 2015, 10 pages.

* cited by examiner

DISPLAY SCREEN AND TERMINAL DEVICE USING SAME

This application claims priority to International Application No. PCT/CN2011/077791 filed Jul. 29, 2011; to Chinese Patent Appin. CN 201010242747.X filed on Jul. 30, 2010; and to Chinese Patent Appin. CN 201010274331.6 filed on Sep. 6, 2010, the entire contents of each are incorporated herein by reference.

The present disclosure relates to display screen, terminal device using same, and control method thereof.

BACKGROUND in the recent years, video calls (conferences) or video chats using terminal devices such as notebooks or mobile phones are becoming increasingly popular with the development of the network. In order to achieve the video call or video chat function, a camera component is usually placed above the screen of the terminal device.

In this situation, since the user always looks at the image of the correspondent on the screen in his/her line of sight, and the area to which the line of sight aligns is far away from the actual position of the camera component, the user always cannot make a eye contact with the correspondent in the video call or video chat. Thereby, the user experience of the video call or chat is poor.

SUMMARY

In view of the above problem in the prior art, according to one aspect or the present disclosure, a display screen is provided, comprising: a display panel portion, configured to display an image based on input image data; a transparent fixing component above the display panel portion, configured to protect the display panel portion; and a camera unit provided on a first area of the display panel portion.

In addition, according to another aspect of the present disclosure, a terminal device comprising a display screen is provided, wherein the display screen comprises: a display panel portion, configured to display an image based on input image data; a transparent fixing component above the display panel portion, configured to protect the display panel portion; a camera unit provided on a first area of the display panel portion; and a processing unit configured to process the image acquired by the camera unit, and transmit the image to the display panel portion to display the image thereon.

According to a further aspect of the present disclosure, a display screen is provided, comprising: a display panel portion; a backlight unit provided at the back side of the display panel portion, wherein, an opening is provided on a first area of the backlit unit; a camera unit provided in the opening; and a control unit configured to control the display panel portion, the backlight unit and the camera unit, wherein, the control unit turns off the backlight unit every predetermined time interval in the process of acquiring image by the camera unit; the control unit controls at least the area corresponding to the first area on the display panel portion to enter a transparent state, after the control unit turns off the backlight unit; the control unit controls the camera unit to acquire an image, after at least the area corresponding to the first area on the display panel portion enters the transparent state; and the control unit turns on the backlight unit, and controls the display panel portion to display the image based on the provided image signal, after the camera unit acquires the image.

According to still another aspect of the present disclosure, a method for controlling the display screen to acquire image is provided, wherein the display screen comprises a display panel portion; a backlight unit provided at the back side of the display panel portion and a camera unit provided in a first area of the backlight unit, and the control method comprises: turning off the backlight unit every predetermined time interval in the process of acquiring image by the camera unit; controlling at least the area corresponding to the first area on the display panel portion to enter a transparent state, after the control unit turns off the backlight unit; controlling the camera unit to acquire an image, after at least the area corresponding to the first area on the liquid crystal display pane enters the transparent state; and turning on the backlight unit, and controls the liquid crystal display panel to display the image based on the provided image signal, after the camera unit acquires the image.

According to a further aspect of the present disclosure, a terminal device is provided, comprising: display screen, comprising: a display panel portion; a backlight unit provided at the back side of the display panel portion, wherein, an opening is provided on a first area of the backlight unit; a camera unit provided in the opening Configured to acquire an image of an object outside the display screen; a processing unit configured to control the display panel portion, the backlight unit and the camera unit, and configured to process the image acquired by the camera unit and transmit the image to the display screen for display thereon; wherein, the processing unit turns off the backlight unit every predetermined time interval in the process of acquiring the image by the camera unit; the processing unit controls at least the area corresponding to the first area on the display panel portion to enter a transparent state, after the processing unit turns off the backlight unit; the processing unit controls the camera unit to acquire an image, after at least the area corresponding to the first area on the display panel portion enters the transparent state; and the processing unit turns on the backlight unit, and controls the display panel portion to display the image based en the provided image signal, after the camera unit acquires the image.

With the above configuration, the user looks directly at the screen when he or she is conducting a video call or a video chat. In this situation, the user looks directly at the camera component, and is shot by the camera component. Thereby, the users conducting the video call feel that they make an eye contact with each other, and the user experience in the video call or video chat is improved. Moreover, since the display screen with the camera unit according to the embodiments of the present disclosure does not change the display panel portion substantially, the structure thereof is relatively simple with a low manufacture cost. In addition, since the camera unit is provided on the first area of the display panel portion, the camera unit will not be affected by the display panel.

DETAILED DESCRIPTION

The embodiments of the present disclosure will be described in detail with reference to the figures. Herein, it is to be noted that the same numeral reference will be given to the components with basically the same or similar structure and function, and the repeated description thereof will be omitted.

Figure 1:
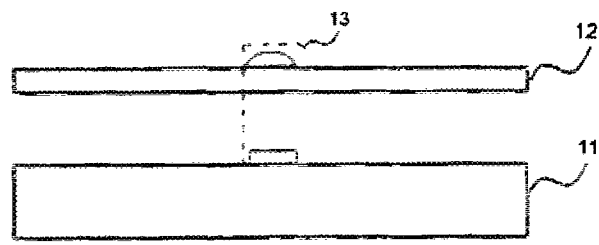
FIG. 1 is a schematic diagram showing a display screen according to a first embodiment of the present disclosure.

FIG. 1 is a schematic diagram showing a display screen 1 according to a first embodiment of the present disclosure.

As shown in FIG. 1, the display screen according to the first embodiment of the present disclosure comprises a display panel portion 11, a transparent fixing component 12 and a camera unit 13. As shown in the figure, the camera unit 13 is provided on the display panel portion 11.

According to an exemplary embodiment of the present disclosure, the display panel portion 11 may display an image or a video based on an Image signal or a video signal inputted to the display screen 1, and may be formed of any display panel components. For example, the display panel portion 11 comprises, but not limited to, a Thin-Film Transistor (TFT) liquid crystal display panel, a Plasma Display Panel (PDP) and an Organic Light-Emitting Diode (OLED) display panel, etc. Those skilled in the art can understand that the display panel portion 11 may also comprise a backlight unit in addition to the liquid crystal display panel, when the display screen 1 is a liquid crystal display panel.

The transparent fixing component 12 may protect the display panel portion 11 and the camera unit 13 etc., and may be formed of, for example a glass plate, an organic glass plate, or a transparent plastic plate with a high transmissivity.

The camera unit 13 may take a shot of an object, and generate an image signal corresponding to the shot object. According to an exemplary embodiment of the present disclosure, the camera unit 13 comprises, but not limited to a Complementary Metal-Oxide-Semiconductor (CMOS)-type camera unit and a Charge Coupled Device (CCD)-type camera unit. In addition, the camera unit 13 may be provided in the middle part of the display panel portion 11 or any position of the display panel portion 11. For example, the camera unit 13 may be provided in the backlight unit when the display screen 1 is a liquid crystal display panel.

As shown in FIG. 1, the image signal generated by the camera unit 13 may be transmitted to a terminal device (not shown) connected with the display screen 1 via a data line. Then, the terminal device may perform predetermined process on the image signal generated by the camera unit 13, and transmit the processed image signal to the display screen 1 for display. For example, according to an embodiment of the present disclosure, the data line may be arranged on the display panel portion 11, and connected to a Digital Signal Processing (DSP) unit or an interface unit (e.g. a Universal Serial Bus (USB) interface) integrated into the timing control circuit of the display panel portion 11, so that the image signal generated by the camera unit 13 may be transmitted to the terminal device (e.g. the main-board of the terminal device) though a Flexible Printed Circuit (FPC). In this case, since the data line connected with the camera unit 13 is usually very thin, the user will not view the data line arranged on the display panel portion 11.

Moreover, according to another embodiment of the present disclosure, the data line may be arranged on the upper surface of the display panel portion 11 by way of etching a transparent electrode. In this case, since the transparent electrode is used as the data line, the user won't notice the wirings existing on the display panel portion 11.

Herein, it is to be noted that the above embodiments of the present disclosure do not relate to the transmission path and the transmission method of the image signal shot by the camera unit 13, that is, the improvement of the connection way and the transmission mode between the internal units of the connected terminal device, and the above content is familiar to those skilled in the art. Therefore, the detailed descriptions about the transmission path of the image signal, the predetermined process to the image signal by the terminal device, etc. are omitted herein.

Part of the structure of the display screen 1 according to the first embodiment of the present disclosure will be described in detail hereinafter with reference to FIG. 2. Herein, it is to be noted that the embodiment of the present disclosure is described taking the TFT-type liquid crystal display panel (LCD) and the CMOS-type camera unit as an example. Nevertheless, obviously the present disclosure is not limited thereto, and may use any other kinds of display panels (e.g. PDP or OLED) and camera units.

Figure 2:
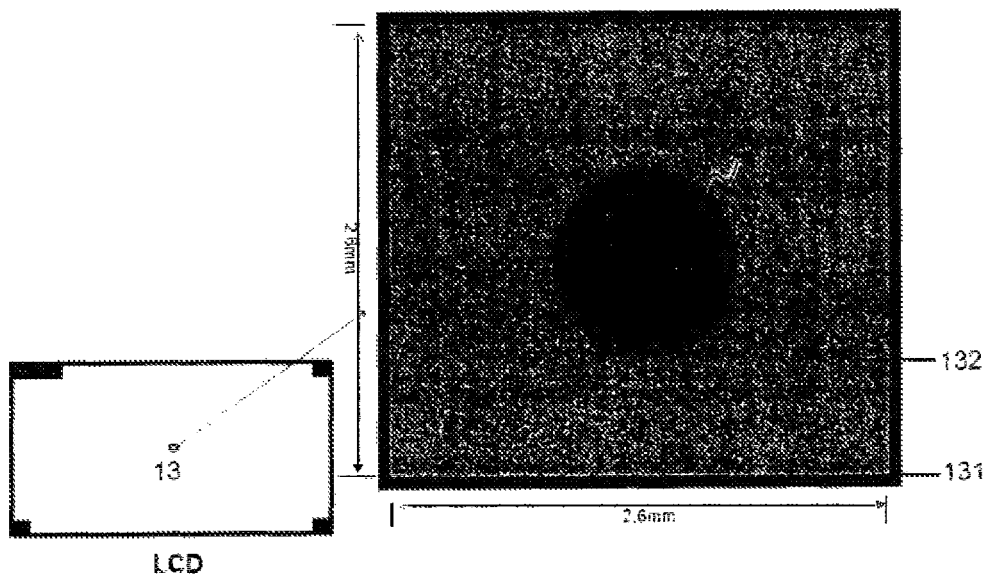
FIG. 2 is an enlarged diagram of a partial area of the display screen shown in FIG. 1.

FIG. 2 is an enlarged diagram of a partial area of the display screen 1 show in FIG. 1, wherein the left part of FIG. 2 is a schematic diagram of the position of the camera unit 13 on the display screen, while the right part of FIG. 2 is a partial enlarged diagram of the camera unit 13.

As shown in FIG. 2, the camera unit 13 comprises a blocking unit 131, a CMOS sensor array 132 comprising CMOS photo-sensitive unit pixel, and a lens unit 133.

According to an embodiment of the present disclosure, the blocking unit 131 may be formed of an opaque (non-transparent) material, and used for blocking light emitted from the display panel portion 11. Since the blocking unit 131 blocks the light emitted from the display panel portion 11, the blocking unit 131 may be used as the dark room of the CMOS sensor array 132 of the camera unit 13. The blocking unit 131 is provided on the upper surface of the display panel portion 11. For example, as shown in FIG. 2, the blocking unit 131 may be provided on the central area of the display panel portion 11. However, the present disclosure is not limited thereto, and the blocking unit 131 may be provided on any other position on the upper surface of the display panel portion 11.

The CMOS sensor array 132 is provided on the upper surface of the blocking unit 131. The CMOS sensor array 132 is used to receive the light incident from the lens unit 133, and generate the image signal corresponding to the object shot by the camera unit 13. Moreover, the CMOS sensor array 132 also transmits the generated image signal to an analog-digital converting unit 14, so as to convert the generated analog image signal into a digital image signal that can be processed by any terminal device and displayed on the display screen 1.

The lens unit 133 is used to receive the light rays from outside, and may form an image on the CMOS sensor so that the CMOS sensor array 132 generates the image signal corresponding to the image. According to an embodiment of the present disclosure, the lens unit 133 may be provided above the transparent fixing component 12. However, the present disclosure is not limited thereto, and the lens unit 133 may be formed in the transparent fixing component 12 based on the manufacture process of the transparent plate. Moreover, the lens unit 133, the CMOS sensor array 132 and the blocking unit 131 etc. may also be integrated together and provided below the transparent fixing component 12.

According to an embodiment of the present disclosure, the CMOS-type camera unit with a small size is used as the camera unit 13. For example, the camera unit 13 may be provided at a position of the central area of the display panel portion 11, wherein the blocking unit 131 of the camera unit 13 covers an area of about 2.6 mm×2.6 mm (approximately an area corresponding to several tens of display pixels on the display panel). According to the CMOS sensor technology in the prior art, about 1000×1000 CMOS photo-sensitive unit pixels may be placed on this area (about 2.6 mm×2.6 mm). Moreover, according to the CMOS sensor technology in the prior art, for the CMOS sensor of this size (about 2.6 mm×2.6 mm), a lens with a diameter of about only 0.6 mm may receive an image from outside of the display screen 1, and form an image on the CMOS sensor of this size. Therefore, even a CMOS-type camera unit 13 of a small size is formed on the display panel portion 11, the user will hardly notice the camera unit when watching the picture displayed by the display screen 1, thereby not affecting the display effect of the display panel portion 11.

In addition, with the increasingly development of the CMOS-type sensor technology, the size of the COMS-type sensor per million pixels is increasingly becoming smaller. Therefore, with the increasingly development of the CMOS-type sensor technology, a CMOS-type lens unit with a smaller size may be used as the camera unit 13 to improve the user experience.

In addition, according to an embodiment of the present disclosure, the camera unit 13 may comprise an analog-digital converting unit (not shown). The analog-digital converting unit may convert the analog image signal generated by the CMOS sensor array 132 into the digital image signal. Since the above embodiment of the present disclosure does not relate to the improvement of the analog-digital converting unit, the analog-digital converting unit may be formed of any analog-digital converting units that can be applied to the CMOS (or CCD etc.) sensor array 132. Since the analog-digital converting unit converts the analog image signal generated by the CMOS sensor array 132 into the digital image signal and 2" bits of data can be transmitted for n data lines, a large amount of data can be transmitted by only a small amount of data lines (e.g. transparent electrode), so as to further decreasing the number of data lines. The user will be even harder to notice the existence of the camera unit 13 by the decrease of the number of the data lines.

In addition, since the CMOS sensor array 132 itself is formed of an opaque material, according to an embodiment of the present disclosure, the blocking unit 131 may not be necessary, and the CMOS sensor array 32 may be provided directly on the upper surface of the display panel portion 11.

The structure of the display screen 3 according to the second embodiment will be described hereinafter with reference to FIG. 3. Since the structure of the display screen 3 according to the second embodiment of the present disclosure differs from that of the display screen 1 shown in FIG. 1 in the structure of the camera unit, the same reference numerals are used to indicate the same or similar components of the display screen 3 as those in the display screen 1 in FIG. 1, and the repeated descriptions thereof are omitted.

Figure 3:
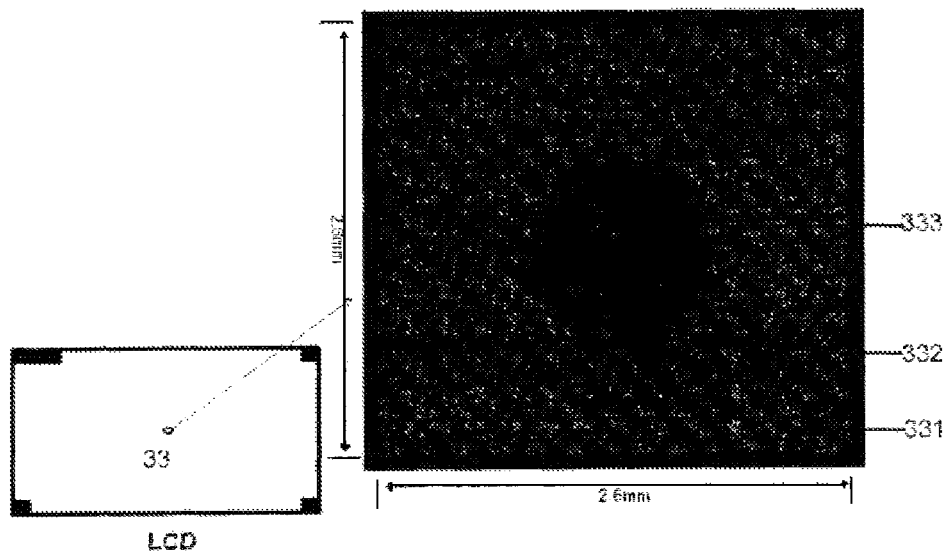
FIG. 3 is an enlarged diagram of the partial area of the display screen according to a second embodiment of the present disclosure.

FIG. 3 is an enlarged figure of a partial area of the display screen 3 according to the second embodiment of the present disclosure, wherein the left part of FIG. 3 is a schematic diagram of the position of the camera unit 33 on the display screen 3, while the right part of FIG. 3 is a partial enlarged diagram of the camera unit 33.

As shown in FIG. 3, the camera unit 33 according to the second embodiment of the present disclosure comprises the blocking unit 331, the CMOS sensor array 332 and the lens unit 333. The camera unit 33 according to the second embodiment of the present disclosure differs from the camera unit 13 shown in FIG. 1 in that the blocking unit 331 comprises multiple openings (i.e. via holes).

As shown in FIG. 3, according to an embodiment of the present disclosure, the position of each opening of the blocking unit 331 corresponds to the position of each display pixel of the area blocked by the blocking unit 331 on the display panel portion 11 (the detailed correspondence will be described later). The purpose of the arrangement of the openings on the blocking unit 331 is to make the light emitted from the display pixels in the area blocked by the blocking unit 331 passes the multiple openings. With the above arrangement, light emitted from the display pixels in the area blocked by the blocking unit 331 may be transmitted outside of the display screen 3 via the multiple openings.

Normally, the display pixels of the display panel portion 11 are consisted of multiple sets of display pixels of red, green and blue (RGB), and various colors that can be recognized by users are generated by mixing each set of RGB display pixels. Multiple openings are provided at the blocking unit 331, and the position of each opening corresponds to the position of each RGB display pixel in the area blocked by the blocking unit 331. In particular, for example, on the area of the display unit made of a set of RGB pixels which consists the smallest display unit necessary for the color mixing, at least one opening of the blocking unit 331 corresponds to the R display pixel, at least one opening of the blocking unit 331 corresponds to the G display pixel, and at least one opening of the blocking unit 331 corresponds to the B display pixel. In this case, lights of each RGB display pixel in the area blocked by the blocking unit 331 may be transmitted outside via the opening corresponding to the RGB display pixels, allowing the light emitted by the RGB display pixels in the display area blocked by the blocking unit 331 to mix so as to generate the desired color.

In this case, even in the area provided with the camera unit 13, the light emitted from the RGB display pixels of the display panel portion 11 may also be transmitted outside through the openings, achieving the mix of the light emitted from the RGB display pixels. With the above arrangement, when the image is displayed in the display screen 3 according to the embodiment of the present disclosure, even a certain area (such as the central area) of the display panel portion 11 is placed with the camera unit 33, the user can view the image corresponding to the display area, and wont notice that there is the camera unit 33 in this area. Meanwhile, since the light rays emitted from the RGB display pixels pass the openings and are transmitted outside through the transparent fixing component 12, the light rays emitted from the RGB display pixels will not scatter in the blocking unit 331. Therefore, the blocking unit 331 with openings can still function as a dark room, whereby assuring the image quality of the photo-sensitive units provided thereon.

The blocking unit 331 with openings and the position of the photo-sensitive units provided on the blocking unit 331 will be described hereinafter in detail with reference to FIG. 4.

Figure 4:
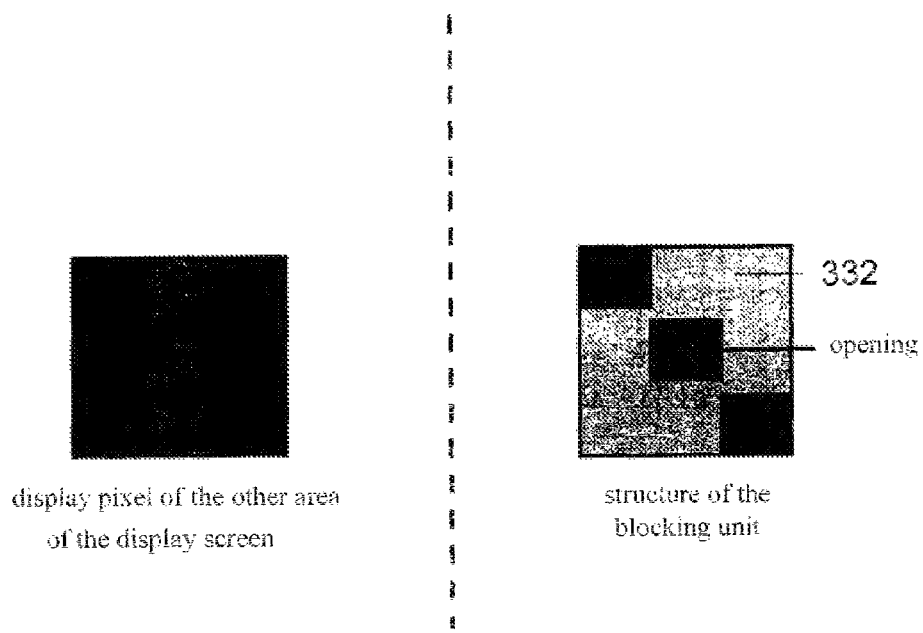
FIG. 4 is a partial enlarged diagram of the blocking unit and the arrangement of the CMOS sensor array shown in FIG. 3.

FIG. 4 is a partial enlarged diagram of the blocking unit and the arrangement of the CMOS sensor array 332 shown in FIG. 3. The left part of FIG. 4 is the arrangement of the pixels in the other area of the display screen 3, while the right part of FIG. 4 is the arrangement of the opening of the blocking unit 331 and the CMOS sensor array 332.

According to an embodiment of the present disclosure, multiple openings are provided at the blocking unit 331, and the multiple openings correspond to the RGB display pixels in the display area blocked by the blocking unit 331. As shown in FIG. 4, in the area corresponding to the unit display area of the display panel portion 11, the position of the opening is configured in a diagonal manner. Herein, the unit display area refers to an area formed of a set of RGB display pixels, wherein various colors that are visible by the user are generated by mixing the light rays emitted from the RGB display pixels in the unit display area. By the diagonal manner, the openings are configured corresponding to each display pixel of the RGB display pixels in the unit display area, so that the light rays from each RGB display pixel may pass the opening to form the image through mixing.

Moreover, on the upper surface of the blocking unit 331, the CMOS sensor array 332 is provided in an area without openings. Since the size of the CMOS photo-sensitive unit pixel in the CMOS sensor array 332 is far smaller than the size of the RGB display pixel, enough CMOS photo-sensitive unit pixels may be provided in the above area by setting the size of the opening properly, even the CMOS sensor array 332 is placed on the area with no openings on the surface of the blocking unit 331, thereby assuring that there are enough pixels in the camera unit 33 to form the image big enough. For example, according to an embodiment of the present disclosure, the opening of the blocking unit 331 may be configured of a size of about ⅓ of the RGB display pixels. With the above arrangement, on one hand sufficient CMOS photo-sensitive unit pixels can be provided in the area with no openings, on the other hand, sufficient light can pass the openings of the blocking unit 331, so that the user won't notice the brightness of the image in the display area placed with the camera unit 33 is darker than the image of other display area of the display screen 3. Moreover, the present disclosure is not limited thereto, and the size of the opening may be determined as necessary. In addition, the number of the openings may be determined properly (for example, one opening is configured for two R display pixels, etc.) In addition, the arrangement manner of the openings of the blocking unit 331 is not limited to the diagonal manner. As long as the lights of the RGB display pixels through these openings can be mixed to generate various colors visible by the user eyes, other arrangements are possible.

Hereinafter, a case Will be described in which a video call or a video chat is conducted by using the display screen 3 according to the second embodiment of the present disclosure.

For example, when the video call or the video chat is conducted by using the display screen 3, the camera unit 33 takes a picture of the user and generates an image signal, and the analog-digital converting unit 14 converts the analog image signal generated by the camera unit 33 into a digital image signal, and transmits the generated digital image signal to a terminal device (not shown) connected with the display screen 3 for predetermined processings. Then, the terminal device transmits the processed image or video signal to the display screen 3 for display.

When the video call or the video chat is conducted, since multiple openings are provided at the blocking unit 331, and the position of each opening of the multiple openings corresponds to the corresponding RGB display pixels in the display area blocked by the blocking unit 331, in this case the light rays from each RGB display pixel may pass the opening to form the image through mixing. Therefore, even the camera unit 33 is placed on the display panel portion 11, the user will not notice the lack of the image in the display area placed with the camera unit 33. Meanwhile, since the CMOS sensor array 332 is placed in the area without the openings, and light passes the transparent fixing component 12 directly via multiple openings of the blocking unit 331, light of the RGB display pixels passing the openings will not affect the image generated by the CMOS sensor array 332 substantially.

In addition, in a case where the video call or the video chat is conducted without the camera unit 33, since multiple openings are provided at the blocking unit 331, and each opening of the multiple openings corresponds to the corresponding RGB display pixel in the display area blocked by the blocking unit 331, the light rays from each RGB display pixel may pass the opening to form the image through mixing. In this case, image may also be displayed in the area placed with the camera unit 33. Moreover, the user won't notice the existence of the camera unit 33.

Therefore, according to the exemplary embodiment of the present disclosure, the camera unit 33 can generate relatively good image, while the user won't notice the existence of the camera unit 33 on the display screen 3. In this case, since the user looks directly at the display screen 3 to conduct the video call or the video chat, the users make eye contact with each other, thereby improving the user experience.

Moreover, according to another embodiment of the present disclosure, the image generated by the camera unit 33 can be compensated for. The reason for the compensation of the image generated by the camera unit 33 lies in that, since multiple openings are configured at the blocking unit 331 and CMOS photo-sensitive unit pixels are not configured at these openings, the loss of the CMOS photo-sensitive unit pixels may have disadvantage effect on the image generated by the camera unit 33. Normally, the image generated b the carrier unit 33 is compensated by interpolation technology. In particular, the image information at the openings is computed by interpolation with the information acquired by the CMOS photo-sensitive unit pixels provided around the opening at the blocking unit 331. Since embodiments of the present disclosure does not relate to the improvement the interpolation algorithm, the compensation of the image may be done by any interpolation computation, and the detailed description about the interpolation algorithm is omitted herein.

In addition, for improving the dark room effect required by the CMOS sensor array of the camera unit, a one-way transparent film is provided around the lens unit. According to an embodiment of the present disclosure, the one-way transparent film may be provided on the transparent fixing component 12, and the position and the area of the one-way transparent film correspond with the area occupied by the blocking unit 131 (331). The one-way transparent film according to the embodiment of the present disclosure may be formed of any one-way transparent materials. The one-way transparent film is configured to block rays emitted to the CMOS sensor array 132(332) on the blocking unit 131(331) from outside the display screen 1(3), and allow the light emitted through the opening by the RGB display pixels to pass the one-way transparent film.

With the above arrangement, the dark room effect required by the CMOS sensor array of the camera unit is improved without affecting the user watching the image displayed on the display screen, thereby further improving the quality of the image generated by the camera unit.

Hereinafter, the structure of the display screen according to the third embodiment of the present disclosure will be described with reference to FIG. 5.

Figure 5:
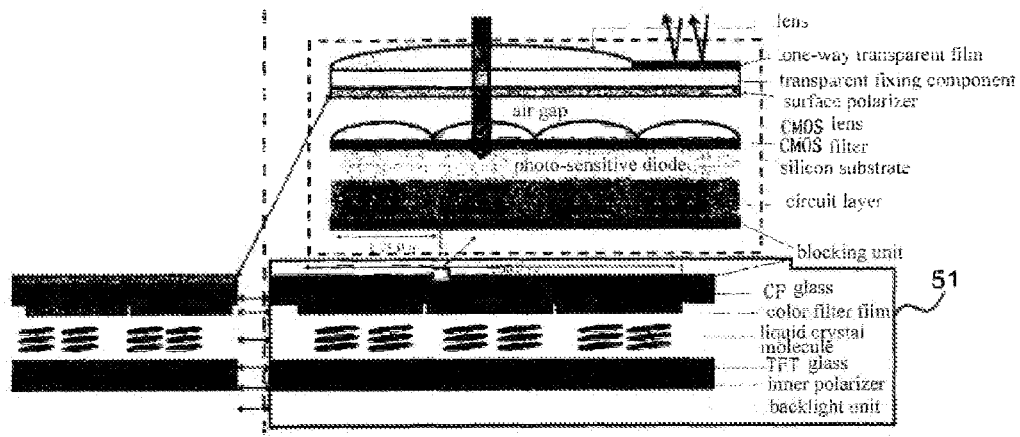
FIG. 5 is a sectional diagram of the display screen according to a third embodiment of the present disclosure.

FIG. 5 is a sectional diagram of the display screen 5 according to the third embodiment of the present disclosure, wherein the left part of FIG. 5 is the structure of the TFT-type display panel in the prior art, while the right part of FIG. 5 is the structure of the display screen 5 according to the third embodiment of the present disclosure.

As shown in FIG. 5, the display screen 5 according to the third embodiment of the present disclosure differs from the display screen 1 shown in FIG. 1 in that a surface polarizer on the TFT-type display panel 51 is placed on the transparent fixing component of the display screen 5. Here, since the structures of the individual layers of the TFT-type display panel 51 and the structures of the individual layers of the CMOS photo-sensitive unit pixel are familiar to those skilled in the art, the detailed description about the structures thereof is omitted here.

As shown in FIG. 5, the upper surface of the display panel 51 of the display screen 5 is a CF glass and a surface polarizer. Since components such as the photo-sensitive units needs to be placed at the position of the surface polarizer the surface polarizer is placed below the transparent fixing component 12, and the blocking unit is placed on the CF glass at the display panel 51. Since the surface polarizer is used to polarize the light emitted from die display panel 51, the placement of the surface polarizer below the transparent fixing component 12 will not affect the image effect displayed by the display panel 51, and can prolong the lifetime of the display screen 5.

With the above arrangements, the display screens according to the first to the third embodiments of the present disclosure are described. With the above arrangements, the user looks directly at the display screen when the user is conducting a video call or a video chat. In this case, the user looks directly at the camera unit and the camera unit takes a shot of the user, so that the users in the video call feel that they are in eye contact, thereby improving the user experience in video calls or chats. Moreover since the display screens with the camera unit according to the first to the third embodiments of the present disclosure do not change the display panel portion substantially, its structure is relatively simple, and is of a low manufacture cost. In addition, since the camera unit is placed on the first area of the display panel portion, the camera unit will not be affected by the display panel. Meanwhile, since multiple openings are configured at the blocking unit of the camera unit, it ensures that the image/content displayed on the display panel will not be affected by the camera unit.

The structures of the display screens according to the first to the third embodiments of the present disclosure are described above in detail. The display screens according to the first to the third embodiments of the present disclosure may be applied to a terminal device with a display screen, and with a function of video chat or video call etc. The terminal device comprises a display screen and a processing unit. The display screen comprises: a display panel portion, a transparent fixing component and a camera unit; wherein, the display panel portion is configured to display an image based on input image data: the transparent fixing component above the display panel portion is configured to protect the display panel portion; the camera unit provided on a predetermined area of the display panel portion is configured to acquire the image; the processing unit is configured to process the image acquired by the camera unit, and transmit the image to the display panel portion to display the image thereon.

For example, the terminal device with the display screen according to the embodiments of the present disclosure may be terminal devices such as a computer, a notebook, a mobile phone, a PDA, etc. The terminal device such as a computer, a notebook, a mobile phone, a PDA, etc. comprise a processing unit to process the image acquired by the camera unit when in a video chat or a video call, and transmit the image to the display panel portion of the display screen to display the image generated by the camera unit on the display panel portion. Moreover, in a case in which the video call or the video chat is conducted without the camera unit, due to the special structure of the camera unit, the user wont notice the existence of the camera unit, thereby the effect of watching the image displayed on the display screen by the user will not be affected.

As described above, in addition to the first to the third embodiments of the present disclosure, for example, when the display screen is a liquid crystal display screen, the display panel portion comprises a liquid crystal display panel and a backlight unit, wherein the liquid crystal display panel itself does not illuminate. In this case, in addition to placing the camera unit on the liquid crystal display panel, the camera unit may be alternatively placed in the backlight unit. The case where the camera unit is placed in the backlight unit will be described later in detail. In the following description, the liquid crystal display panel is referred to as the display panel in short.

According to an embodiment of the present disclosure, a display screen is provided, which comprises a display panel; a backlight unit provided at the back side of the display panel, wherein, an opening is provided on a first area of the backlight unit, and a camera unit provided in the opening, which is configured to acquire an image of an object outside the display screen; and a control unit configured to control the display panel, the backlight unit and the camera unit, wherein, the control unit turns off the backlight unit every predetermined time interval in the process of acquiring image by the camera unit; the control unit controls at least the area corresponding to the first area on the display panel to enter a transparent state, after the control unit turns off the backlight unit; the control unit controls the camera unit to acquire the image, after at least the area corresponding to the first area on the display panel enters the transparent state: and the control unit turns on the backlight unit, and controls the LCD display panel to display the image based on the provided image signal, after the camera unit acquires the image.

In addition, according to an embodiment of the present disclosure, a method for controlling the display screen to acquire image is provided, wherein the display screen comprises a display panel; a backlight unit provided at the back side of the display panel and a camera unit provided in a first area of the backlight unit, and the control method comprises: turning off the backlight unit every predetermined time interval in the process of acquiring image by the camera unit; controlling at least the area corresponding to the first area on the display panel to enter a transparent state, after the backlight unit is turned off; controlling the camera unit to acquire the image, after at least the area corresponding to the first area on the display panel enters the transparent state; and turning on the backlight unit, and controls the display panel to display the image based on the provided image signal, after the camera unit acquires the image.

In addition, according to an embodiment of the present disclosure, a terminal device is provided, comprising: a display screen which comprises a display panel; a backlight unit provided at the back side of the display panel, wherein, an opening is provided on a first area of the backlight unit; a camera unit provided in the opening, which is configured to acquire an image of an object outside the display screen; and a processing unit configured to control the display panel, the backlight unit and the camera unit, and configured to process the image acquired by the camera unit and transmit the image to the display screen for display thereon; wherein, the processing unit turns off the backlight unit every predetermined time interval in the process of acquiring image by the camera unit; the processing unit controls at least the area corresponding to the first area on the liquid crystal display panel to enter a transparent state, after the processing unit turns off the backlight unit; the processing unit controls the camera unit to acquire the image, after at least the area corresponding to the first area on the display panel enters the transparent state; and the processing unit turns on the backlight unit, and controls the display panel to display the image based on the provided image signal, after the camera unit acquires the image.

Figure 6:
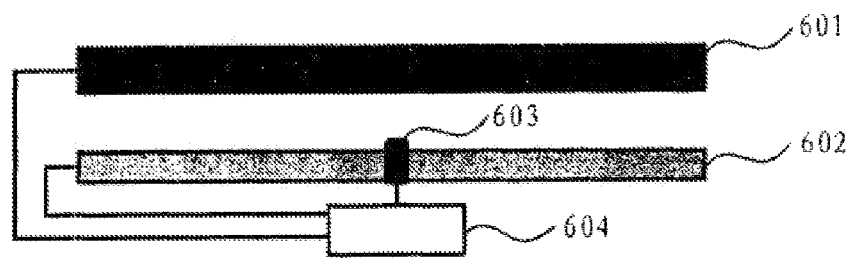
FIG. 6 is a schematic diagram of the structure of the liquid crystal display screen according to a fourth embodiment of the present disclosure.

The display screen according to the fourth embodiment of the present disclosure will be described hereinafter. FIG. 6 is a schematic diagram of the structure of a liquid crystal display screen according to the fourth embodiment of the present disclosure.

For example, the liquid crystal display screen 600 according to the fourth embodiment of the present disclosure comprises a display panel 601, a backlight unit 602, a camera unit 603 and a control unit 604. As shown in FIG. 6, the backlight unit 602 may be placed at the back side of the display panel 601. In addition, for example, an opening (via hole) is provided in the central area of the backlight unit 602, and the camera unit 603 such as the CMOS-type camera etc. is inserted into the opening. The control unit 604 is connected with the display panel 601, the backlight unit 602 and the camera unit 603, and can control the operations of the liquid crystal display panel 601, the backlight unit 602 and the camera unit 603.

According to the embodiment of the present disclosure, the display panel 601 may be formed of any kinds of liquid crystal display panels, such as TFT, ColorSuper Twisted Nematic (CSTN), Plane to Line Switching (PLS), etc, and may generate image based on the image signal provided from the external device. The described external device may be a computer, or may be a notebook, a mobile phone, a PDA or parts other than the display screen of the integrated computer, for example, the Central Processing Unit (CPU) or the display card of the notebook. The display panel 601 may change the arrangement (i.e., the transmittance) of the internal liquid crystal molecules based on the image signal, so as to display images with different tones and brightnesses using the light rays emitted from the backlight unit 602. That is to say, the display panel 601 may switch between the transparent (with different transmissivity) state and the non-transparent state.

In addition, the backlight unit 602 may comprise any backlight lamp applicable to the display screen. When the backlight unit 602 is on the backlight unit 602 illuminates, and the display panel 601 generates the image visible by the user based on the provided image signal by using the light generated by the backlight unit 602. For example, the display panel 601 may change the arrangement of the internal liquid crystal molecules based on the image signal received from the external device, so as to make the light from the backlight unit 602 pass the LCD display panel 601 and the polarizer and the filter configured thereon (not shown) to generate display images with different tones and brightnesses. Since the fourth embodiment of the present disclosure does not relate to the change to the display panel 601, and the structure and the operation are well known to those skilled in the art, the detailed description about the individual layers and the operations thereof of the display panel 601 is omitted here. On the other hand, when the backlight unit 602 is off, since the display panel 601 itself cannot illuminate actively the user cannot view the generated image even when different image signals are provided to the display panel 601.

The camera unit 603 my comprise any kinds of CMOS or CCD type camera units. Since the structure of the CMOS or CCD-type camera unit is familiar to those skilled in the art, the detailed description about the internal, structure thereof is omitted here. According to an embodiment of the present disclosure, a CMOS or CCD-type camera unit of a small size is used. For example, according to the current CMOS or CCD technology, several millions of photo-sensitive units (CMOS or CCD photo-sensitive pixels) are integrated per square millimeter. Therefore, only a small opening (e.g. a via hole with a diameter below 1 mm) in the central area of the backlight unit 602 is enough to accept the camera unit 603 therein while assuring the imaging quality, so that the camera unit 603 may receive lights of the display panel 601 to acquire image. In particular, the lights may be better accepted b inserting the camera unit 603 into the opening placed in the backlight unit 602 and making the lens (not shown) of the camera unit 603 extrude from the backlight unit 602, while the photo-sensitive unit (the CMOS or CCD element) of the camera unit 603 may be placed in the opening. In addition, according to another embodiment of the present disclosure, the shape of the opening may be configured properly according to the shape of the camera unit 603. For example, since the lens at the top of the camera unit 603 usually has the smallest size (for example, the lens may have a diameter of 0.4 mm), and the photo-sensitive portion usually has a relatively large area, the top part of the opening of the backlight unit 602 may be configured to allow only the lens of the camera unit 603 to pass, while the internal part of the opening of the backlight unit 602 may be configured to accept the photo-sensitive part of the camera unit 603. In this case, since the top part of the opening is configured to be small, the user will hardly notice the camera unit 603 on the display screen 600 even when the display screen 600 does not work.

The control unit 604 may be realized by any microprocessors, DSPs performing predetermined operations based on a predetermined program or firmware, and may control the operations of the display panel 601, the backlight unit 602, and the camera unit 603. For example, according to an embodiment of the present disclosure, the control unit 604 may be a drive control circuit of the display screen 600. Moreover, the present disclosure is not limited thereto, and the control unit 604 may also be realized by a processor (such as a CPU etc.) in a terminal device (not shown) connected with, the display screen 600.

Figure 7:
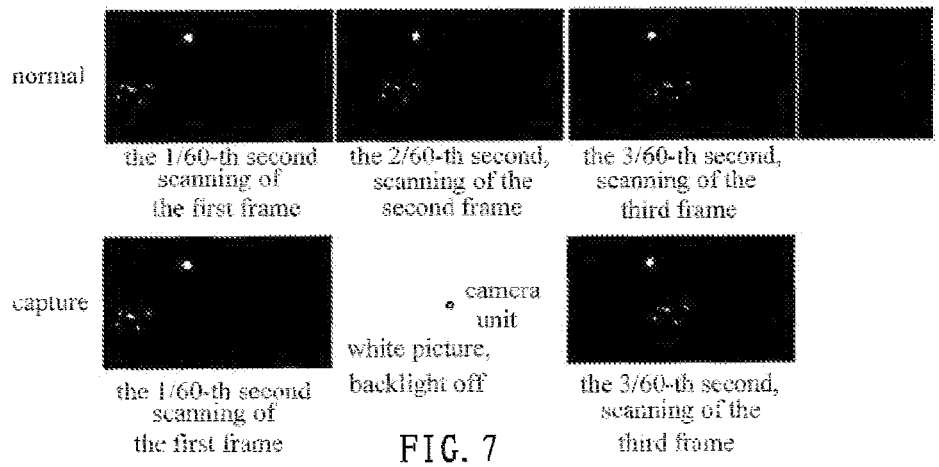
FIG. 7 is a flowchart of operations performed by the liquid crystal display screen according to the fourth embodiment of the present disclosure.

The operations performed b the liquid crystal display screen 600 according to the fourth embodiment of the present disclosure will be described hereinafter. FIG. 7 is a flowchart showing the operations performed by the liquid crystal display screen 600 according to the fourth embodiment of the present disclosure, wherein the upper part of FIG. 7 illustrates the case in which the liquid crystal display screen 600 performs the normal display, while the lower part of FIG. 7 illustrates the operations performed by the liquid crystal display screen 600 when the camera unit 603 performs image acquisition.

As shown in FIG. 7, when the display screen 600 according to the fourth embodiment of the present disclosure displays an image normally, the camera unit 603 does not work the backlight unit 602 turns on and illuminates, and the display screen 600 receives the image signal from the external device (such as a display card or a CPU). In this case, the display panel 601 change the arrangement of the internal liquid crystal molecules based on the image signal received from the external device, so as to make the light from the backlight Unit 602 pass the display panel 601 and the polarizer and the filter configured thereon (not shown) to generate different images. Since the fourth embodiment of the present disclosure does not relate to the change to the display panel 601, and the structure and the operations are well known to those skilled in the art, the detailed description about the individual lays and the operations thereof of the display panel 601 is omitted here.

According to an embodiment of the present disclosure, since there is an opening in the central area of the backlight unit 602, and there is the camera unit 603 in the opening, there is no light source in this area (the camera, unit 603 does not illuminate). Therefore, black spots may occur at the corresponding position (central area) of the liquid crystal display panel due to the lack of the light source. However, since a camera unit with a small size (such as, smaller than 1 square millimeter or even smaller when the shape of the opening is designed properly) is used in the display screen 600 according to the embodiment of the present disclosure, and the light emitted from the backlight around the opening of the backlight unit 602 may compensate for the lack of the light source at the position of the opening, the brightness of the image (the brightness of she display pixel) at the position corresponding to the camera unit 603 on the display panel 601 is only a little darker than that of the image it should display, and the user will hardly notice such brightness change. Therefore, the user will hardly notice the camera unit 603 in the display screen 600.

The operations performed by the display screen 600 when the camera unit 603 is taking shots will be described hereinafter.

Now, the operations of the liquid crystal display screen 600 according to the fourth embodiment of the present disclosure will be described by way of an example in which the display screen 600 displays images with a refresh rate of 60 Hz. As shown in FIG. 7, when the user conducts a video call or a video conference using the display screen 600 according to the fourth embodiment of the present disclosure, the user starts the image acquisition function of the display screen 600 by an input unit (not shown). When the camera unit 603 is performing the image acquisition, the control unit 604 turns off the backlight unit 602 every predetermined time interval. Then, the control unit 604 controls at least the area corresponding to the camera unit 603 on the display panel 601 to enter a transparent state. The control unit 604 controls the camera unit 603 to acquire the image, after at least the area corresponding to the camera unit 403 on the display panel 601 enters the transparent state. The control unit 604 turns on the backlight unit and the display panel 601 displays the image based on the image signal provided thereto, after the camera unit 603 acquires the image. In the above description, the control unit 604 may cause the display panel 601 to enter the transparent state by providing the image to the display panel 601. Optionally, the image provided is a white image.

In particular, for example, in a time period of the 1/60-th second (16 ms), the backlight unit 602 turns on, and the display panel 601 displays the image normally based on the image signal provided by the external device. Then, in the time period of the 2/60-th second 16 ms), when the image acquisition starts, fir the control unit 604 turns off the whole backlight unit 602. Then, the control unit 604 discards the image signal provided by the external device (i.e., not use the image frame of the 2/60-th second provided by the external device), and causes at least the area corresponding to the camera unit 603 on the display panel 601 so enter the transparent state. For example, the control unit 604 may cause the whole display panel 601 into the transparent state by providing a white image to the display panel 601. Here, the purpose of providing a white image to the display panel 601 is that, the transmissivity of the liquid crystal layer in the display panel 601 is the highest when it presents a white image, so that more light can achieve the camera unit 603 via the display panel 601. However the present disclosure is not limited thereto, and the display panel 601 may enter the transparent state by other image (e.g. gray) provided thereto. Alternatively, the area corresponding to the camera unit 603 on the display panel 601 may enter the transparent state by any image with the area corresponding to the camera unit 603 being white. In addition, in a case where the display panel 601 is a normally-white display pan& (presenting a white picture with no power), it may cause the display panel 601 to enter the transparent state by stopping providing the voltage to the display panel 601.

For example, in a case where the control unit 604 controls at least the area corresponding to the camera unit 603 on the display panel 601 to enter the transparent state by transmitting the image to the display panel 601, since the backlight unit 602 turns off and does not illuminate, the user will not see the flicking of the picture on the display screen 600 (such as suddenly turning to an all-white or other image, etc.). In addition, another purpose of turning, off the backlight unit 602 is to avoid the light generated by the backlight unit 602 affecting the light passing the display panel 601 (affecting the image acquisition effect of the camera unit 603). In this case, since at least the area corresponding to the camera unit 603 on the display panel 601 may pass the light, the camera unit 603 can use the light passing the display panel 601 to acquire images.

After the control unit 604 makes at least the area corresponding to the camera unit 603 on the display panel 601 to enter the transparent state, the control unit 604 initiates the camera unit 603 to acquire images. Next, when the image acquisition of the camera unit 603 is finished or when the predetermined acquisition finish time arrives, in the 3/60-th second, the control unit 604 turns off the camera unit 603, and then turns on the backlight unit 602, and controls the display panel 601 to display images normally based on the image signal provided from the external device. Then, the control unit 604 repeats the above operations. For example, in the 4/60-th second, the control unit 604 controls the display panel 601, the backlight unit 602 and the camera unit 603 to realize the image acquisition (the same as those in the 2/60-th second), and displays an image normally in the 5/60-th second, until it is not necessary to acquire images by using the camera unit 603 (such as, when the user finishes the video chat, etc.).

The example in which the backlight unit 602 is turned off every other frame and makes at least the area corresponding to the camera unit 603 on the display panel 601 to enter the transparent state has been described above. However, the present disclosure is not limited thereto. According to the study, the user regards the picture as being continuous when the pictures are displayed with a fame rate above 30 FPS (frame/second) on the display screen 600, and when the sample rate of the camera unit 603 is above 15 FPS, the resulting video is normally regarded as being continuous. In addition, according to the current technology, since the refresh rate of the display screen 600 is normally at least 60 Hz (that is, 60 frame images are refreshed in one second), as long as the working timings of the display panel 601, the backlight unit 602 and the camera unit 603 can be set properly, continues display pictures and continues acquisition pictures are easily to be obtained. For example, the above operations may be repeated every three frames (i.e., two frames for display, one frame for acquisition, so that 40 frame in can be displayed and 20 frame images can be acquired in one second). Alternatively, in order to improve the image quality of the camera unit 603 the image acquisition may be performed in a time period of two frames after 2 frame images are displayed (so that 30 frame images can be displayed and 30 frame images can be acquired in one second). In addition, when the liquid crystal display screen 100 supports a higher refresh rate (such as 90 Hz), more fluent image display and image acquisition can be achieved by setting the proportion of the image display and the image acquisition properly.

Here, it is to be noted that the image acquired by the camera unit 603 may be transmitted to the external device connected with the display screen 600 via a known transmission path (line) in the above manner, and the external device may transmit the image acquired by the camera unit 603 to the terminal device of the other party (parties) in the video call or chat by any wire or wireless communication method, to display the image acquired by the camera unit 603 on the terminal device. In addition, for example, when the user using the display screen 600 tests the image acquisition function of the display screen 600, the image acquired by the camera unit 603 is transmitted to the external device connected with the display screen 600, and the external device returns the image acquired by the camera unit 603 to the display screen 600 for display. Since the image display and the image acquisition are performed separately and do not interfere with each other as described above, similarly, in the time period when the camera unit 603 is performing, the image acquisition, the display screen 600 controls the display panel 601, the backlight unit 602 and the camera unit 603 to perform the image acquisition in the above manner, while in other display time periods, the image acquired by the camera unit 603 is displayed by the display screen 600 normally.

With the above configuration, an opening is placed in the predetermined position (such as the central position) of the backlight unit 602, and a camera unit 603 of a small size is placed in the opening. Therefore, the user looks directly at the camera unit 603 when the user looks directly at the display screen 600 in a video call or a video chat, so that the users in the video call feel that they are in eye contact with each other. Therefore, comparing with the prior art, the user experience in video calls or chats is improved when the video call or video chat is conducted by using the display screen 600 according to the fourth embodiment of the present disclosure.

In addition, the whole backlight unit 602 is turned off when using the camera unit 603 to acquire images, so that at least the area corresponding to the camera unit 603 on the display panel 601 enters the transparent state and the camera unit 603 is used to acquire images. In this case, the image display and the image acquisition are performed separately and do not interfere with each other, and the camera unit 603 may perform image acquisition by using the transmittance property of the display panel 601. Therefore, the user can perform image acquisition, while will not notice the effect on the image displayed on the display screen 600 by the image acquisition, when the user is having a video call or chat using the display screen 600 according to the fourth embodiment of the present disclosure, thereby the user experience in the video call or chat will not be affected.

The operations performed by the display screen 600 according to the fifth embodiment of the present disclosure will be described hereinafter. Here, it is to be noted that operations before the camera unit 603 is turned off and the backlight unit 602 is turned on are the same as those described with reference to the fourth embodiment, therefore, the repeated descriptions are omitted for brevity.

The control unit 604 may also control the display panel 601 to enter a non-transparent state, after the image acquisition is finished by the camera unit 603 or the predetermined acquisition finish time arrives, and before the backlight unit is turned on. In particular, since the liquid crystal layer is in a non-transparent state when the display panel 601 presents a black image, the control unit 604 may make the display panel 601 to enter the non-transparent state by transmitting a black image thereto. Moreover, the present disclosure is not limited thereto, and the display panel 601 may be caused to enter the non-transparent state by shutting down the power of the display panel 601 when the display panel 601 is a normally-black display panel (i.e., presenting black when there is no power).

As described above, in order to make at least the area corresponding to the camera unit 603 on the display panel 601 to enter the transparent state, an image such as a white image may be provided to the display panel 601. In this case, the Image may flicker after the image acquisition of the camera unit 603 is finished and the backlight unit 602 is turned on to display image based on the image signal provided from the external device. This is because that the display panel 601 updates images progressively when the backlight is on according to the work manner of the display panel 601 (that is, the display panel 601 updates the image in a progressive manner), and in the area yet to be updated on the display panel 601, the image that is used for making the display panel 601 transparent, such as the white image inserted before, is still displayed. The image is usually different from the image displayed based on the image data provided from the external device by the display panel 601. Therefore, the user may feel that the display image is flickering. By controlling the display panel 601 to enter the non-transparent state (such as by inserting a black image) before the backlight unit 602 is turned on, even the backlight unit is turned on, since the display panel 601 is not transparent, a black image is displayed in the area yet to be updated on the display panel 601, which is not noticeable. Therefore, by controlling the display panel 601 to enter the non-transparent state before the backlight unit 602 is turned on, image flicking of the display screen 600 may be avoided effectively, and the user experience is improved.

Figure 8:
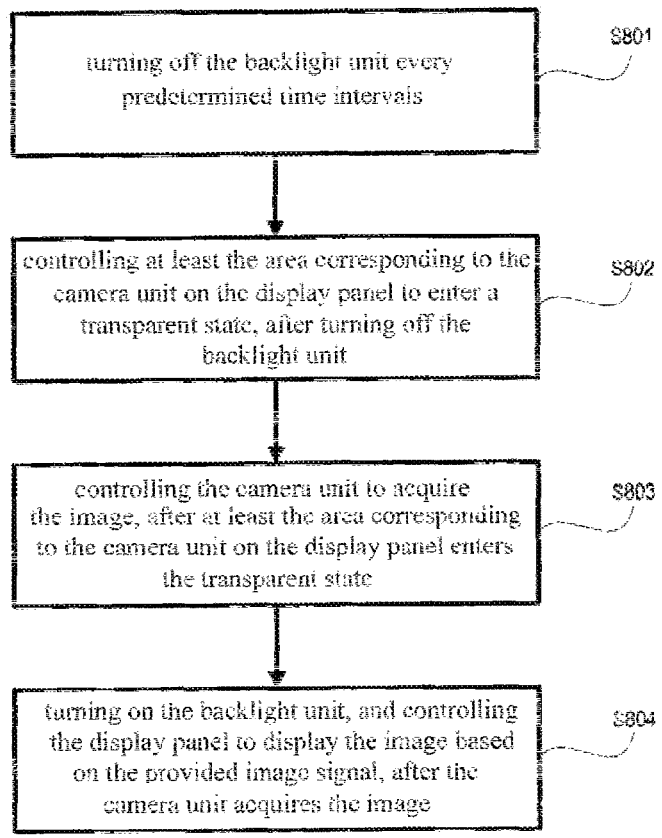
FIG. 8 is a flowchart of a control method performed by the liquid crystal display screen according to the fourth embodiment of the present disclosure.

Next, the control method performed by the display screen 600 according to the fourth embodiment of the present disclosure when the camera unit 603 is used to acquire image will be described. FIG. 8 is a flowchart of a control method performed by the liquid crystal display screen 600 according to the fourth embodiment of the present disclosure.

As shown in FIG. 8, when in a process of using the image acquisition function of the display screen 600 (i.e., using the camera unit to acquire image), at the step S801, the backlight unit is turned off every predetermined time intervals.

In particular, when the image acquisition starts, the control unit 604 turns off the backlight unit 602 every predetermined time intervals such as every other frame).

At the step S802, at least the area corresponding to the camera unit 603 on the display panel 601 is controlled to enter a transparent state, after the backlight unit 602 is turned off.

In particular; the control unit 604 may control the display panel 601 to enter the transparent state by providing a white image to the display panel 601. In addition, at least the area corresponding to the camera unit 603 on the display panel 601 may be caused to enter the transparent state by providing another image such as a gray image) or an image with a white area corresponding to the area of the camera unit 603 to the display panel 601. In addition, in a case where the display panel 601 is a normally-white display panel, the whole display panel 601 may be caused to enter the transparent state by shutting down the power of the display panel 601.

At the step S803, the camera unit is controlled to acquire an image, after at least the area corresponding to the camera unit 603 on the display panel 601 enters the transparent state.

In particular, after the control unit 604 makes at least the area corresponding to the camera unit 603 on the display panel 601 to enter the transparent state, the control unit 604 initiates the camera unit 603 to acquire images.

At the step S804, after the camera unit 603 acquires images, the backlight unit 602 is turned on, and the display panel 601 is controlled to display an image based on the provided image signal.

In particular, the control unit 604 turns off the camera unit 603, turns on the backlight unit 602, and controls the display panel 601 to display images based on the image signal provided from the external device.

Here, the control unit 604 performs the above steps S801-S804 before the user closes the image acquisition function of the display screen 600 (such as the user finishes the video chat).

Moreover, according to the fifth embodiment of the present disclosure, the control method of FIG. 8 may comprise a step of controlling the display panel 601 to enter a non-transparent state after the camera unit 603 finishes the image acquisition and before the backlight unit 602 is turned on, in particular, the control unit 604 may make the display panel 601 to enter the non-transparent state by transmitting a black image thereto. In addition, when the display panel 601 is a normally-black display panel, the control unit 604 may also control the display panel 601 to enter the non-transparent state by shutting down the power of the display panel 601.

Moreover, according to an embodiment of the present disclosure, the display screen 600 may be formed by various kinds of materials with high transmissivity, to improve the transmissivity of the display screen 600. The improvement of the transmissivity of the display screen 600 may result in that more light arrive at the camera unit 603 by passing the display screen 600, thereby the camera unit 603 may generate images with better quality. In addition, with the same ISO (sensitivity) setting of the camera unit 603, a higher transmissivity may shorten the image acquisition time of the camera unit 603, so as to further shorten the image acquisition time of the camera unit 603, whereby the display screen 600 may allocate more time for image display.

Figure 9:
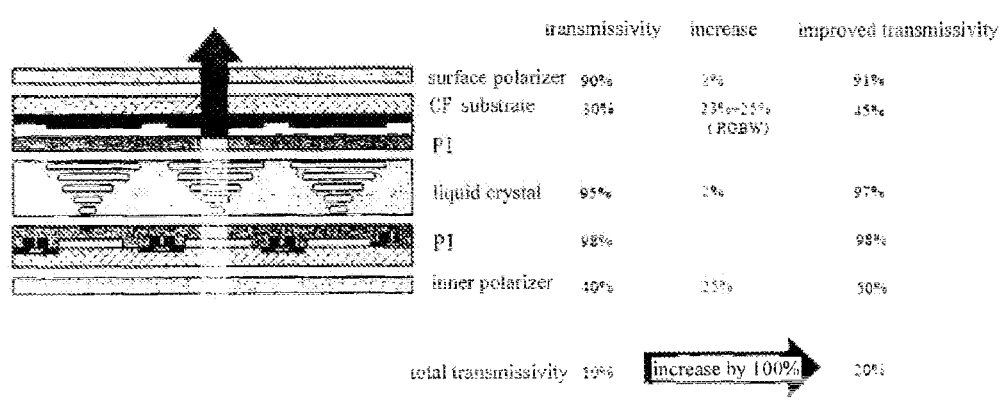
FIG. 9 is a schematic diagram of an example where the transmissivity of the liquid crystal display screen according to the fourth embodiment of the present disclosure is improved by a material with a high transmissivity.

FIG. 9 is a schematic figure of an example in which the transmissivity of the display screen 600 is improved by a material with high transmissivity. Here, it is to be noted that since the embodiment of the present disclosure does not relate to the change to the structure of the individual layers shown in FIG. 9, and the structures and the materials are well known to those skilled in the art, the detailed descriptions thereof are omitted here.

For example, a Glare polarizer with a high transmissivity may be used as the surface polarizer placed at the front side of the display panel 601 and the inner polarizer placed at the back side of the display panel 601, to improve the transmissivity of both (by about 25%). Moreover, the display panel 601 may be a RGBW liquid crystal display panel with a high transmissivity, and the liquid crystal material in the display panel 601 may be a low black liquid crystal molecule material to improve the transmissivity of the display panel 601. Moreover, the area (such as the area of about 5 mm*5 mm in the center of the display panel 601) corresponding to the camera unit 603 on the display panel 601 may be configured with a filter of a low saturation to improve the transmissivity etc.

With the above configuration, the transmissivity of the display screen 600 can be improved effectively, so that the camera unit 603 may generate images with higher quality, and the image acquisition time of the camera unit 603 shortens. According to the experiment by the inventor, the display screen 600 with the above configuration may improve the transmissivity by about 100%. That is, the whole transmissivity of the display screen 600 may be improved from about 10% to about 20%.

The display screen and the control method thereof according to the fourth and fifth embodiments of the present disclosure have been described above. The display screen according to the fourth and fifth embodiments of the present disclosure may be applied to any terminal device with a display screen and with a function such as video call or a video chat.

For example, the terminal device with the display screen according to the fourth and fifth embodiments of the present disclosure may be terminal devices such as a computer, a notebook, a mobile phone, a PDA, etc. The terminal device such as a computer, a notebook, a mobile phone, a PDA, etc. comprises a processing unit (such as a CPU, a microprocessor, a DSP etc.) to process the image acquired by the camera unit 603 in a video chat or a video call, and transmit the image to the display panel portion of the display screen to display the image generated by the camera unit on the display panel portion.

In addition, since the display screen according to the embodiments of the present disclosure may be connected with terminal devices via well-known interfaces and circuits, the processing unit of the terminal device may substitute for the control unit in the display screen, and control the display panel, the backlight unit and the camera unit based on the predetermined program. That is, when the camera unit is used to perform image acquisition, the processing unit may turn off the backlight unit every predetermined time intervals. Then, the processing unit controls at least the area (such as the central area) corresponding to the camera unit on the display panel to enter a transparent state, by transmitting a white image to the display screen etc. Then, the processing unit controls the camera unit to acquire an image. Then, the processing unit turns on the backlight unit, and controls the display panel to display the image based on the provided image signal, after the image acquisition is finished or the predetermined acquisition finish time arrives. The processing unit repeats the above operations, until it is not necessary to acquire images using the camera unit.

In addition, when the terminal device comprises a separate graphic processing unit such as a separate display card, the processing unit may realize the function of the control unit in the display screen by controlling the graphic processing unit. For example, when the camera unit is used to perform image acquisition, the processing unit may turn of the backlight unit every predetermined time intervals. Then, the processing unit may control at least the area corresponding to the camera unit on the display panel to enter a transparent state, by instructing the graphic processing unit to transmit a white image to the display screen etc. Then, the processing unit controls the camera unit to acquire an image. Then, the processing unit turns on the backlight unit, and controls the display panel to display the image based on the image signal provided by the graphic processing unit, after the image acquisition is finished or the predetermined acquisition finish time arrives. The processing unit repeats the above operations, until it is not necessary to acquire images using the camera unit. Obviously, as long as different units (such as the processing unit and the graphic processing unit) cooperate with each other and the work time of the display panel, the backlight unit and the camera unit in the display screen are allocated properly to ensure that the image display and the image acquisition do not interfere with each other, the function of the control unit in the display screen may be realized by multiple different units. In this case, especially when the terminal device is a mobile phone, the display screen may not comprise the control unit to save cost.

In the above description, the description is made by way of an example in which the display screen with a backlight unit is a liquid crystal display screen. However, those skilled in the art can understand that the display screen according to the fourth and fifth embodiments of the present disclosure may be other display panel than the liquid crystal display screen, which does not illuminate itself and can only transmit so that a backlight unit is necessary to illuminate.

Also, for the display screen according to the first to third embodiments of the present disclosure, as well as for the display screen according to the fourth and fifth embodiments of the present disclosure, other structures are applicable than the structure in which the camera unit is placed on the first area of the surface of the display panel of the display panel portion, or respectively the first area of the backlight unit. For example, the display screen according to the fourth and fifth embodiments of the present disclosure may comprise the transparent fixing components for protecting the display panel portion, and the display screen according to the first to third embodiments of the present disclosure may have the surface polarizer and the inner polarizer placed at the front side and the back side of the display panel portion to improve the transmissivity.

Moreover, those skilled in the art can understand that for the display screen according to the first to third embodiments of the present disclosure, when the display screen is a liquid crystal display screen, the display panel portion comprises the play panel and the backlight unit in essence. In this way, the placement of the camera unit to the first area of the display panel portion comprises a case in which the camera unit is placed on the first area of the display panel or the first area of the backlight unit in essence. That is, in certain cases, the first to third embodiment of the present disclosure may be viewed as comprising the fourth to fifth embodiment of the present disclosure. As described above, the individual embodiments of the present disclosure have been described in detail. However, the present disclosure is not limited thereto. Those skilled n the art can understand that various modifications, combinations, sub-combinations or alternations are possible according to the design requirement or other factors, and they are within the scope of the attached claims or the equivalents.

The invention claimed is:

1. A display screen, comprising:
a display panel portion, configured to display an image based on input image data;
a transparent fixing component above the display panel portion, configured to protect the display panel portion; and
a camera unit provided on a first area of the display panel portion and comprising:
a blocking unit provided on the first area of an upper surface of the display panel portion, configured to block light rays emitted from the display panel portion;
a photo-sensitive unit provided on an upper surface of the blocking unit; and
a lens unit provided above the photo-sensitive unit, and
wherein the blocking unit comprises multiple openings configured to pass the light rays emitted from the display panel portion and the photo-sensitive unit is provided on an area on the upper surface of the blocking unit which is not provided with the openings.

2. The display screen of claim 1, wherein, the camera unit further comprises an analog-digital converting unit configured to receive an analog image signal from the photo-sensitive unit, and convert the analog image signal into a digital image signal.

3. The display screen of claim 1, wherein, the lens unit is provided on an upper surface of the transparent fixing component.

4. The display screen of claim 1, wherein, the lens unit is provided in the transparent fixing component.

5. The display screen of claim 1, wherein,
the blocking unit covers multiple display units on the display panel portion, wherein, each display unit comprises at least one set display pixels of red, green and blue; and
in an area corresponding to each display unit, at least one opening of the blocking unit corresponds to the red display pixel, at least one opening of the blocking unit corresponds to the green display pixel, and at least one opening of the blocking unit corresponds to the blue display pixel.

6. The display screen of claim 5, wherein,
the image data at the position of the opening is estimated from the image data generated by the photo-sensitive unit around the opening.

7. The display screen of claim 1, wherein,
a one-way transparent film is provided around the lens unit on the upper surface of the transparent fixing component, and the one-way transparent film corresponds to the first area of the blocking unit, wherein the one-way transparent film blocks light rays emitted to the photo-sensitive unit from outside the display screen, and allows the light emitted through the opening by the display panel portion to pass the one-way transparent film.

8. The display screen of claim 1, wherein,
the display panel portion is at least one of a Thin-Film Transistor (TFT) liquid crystal display panel, a Plasma Display Panel (PDP) and an Organic Light-Emitting Diode (OLED) display panel.

9. The display screen of claim 1, wherein,
a surface polarizer layer is provided on a lower surface of the transparent fixing component.

10. The display screen of claim 1, wherein, the photo-sensitive unit comprises at least one of a Charge Coupled Device (CCD)-type photo-sensitive unit and a Complementary Metal-Oxide-Semiconductor Transistor (CMOS)-type photo-sensitive unit.

11. The display screen of claim 1, wherein,
the display panel portion comprises:
a liquid crystal display panel;
a backlight unit provided at a back side of the liquid crystal display panel, wherein an opening is provided at a first area of the backlight unit;
the camera unit being provided in the opening; and
the display screen further comprises:
a control unit configured to control the liquid crystal display panel, the backlight unit and the camera unit;
wherein, the control unit turns off the backlight unit every predetermined time intervals in the process of acquiring image by the camera unit;
the control unit controls at least an area that corresponds to the first area on the display panel portion to enter a transparent state, after the control unit turns off the backlight unit;

the control unit controls the camera unit to acquire the image, after at least the area corresponding to the first area on the liquid crystal display panel enters the transparent state; and the control unit turns on the backlight unit, and controls the liquid crystal display panel to display the image based on the provided image signal, after the camera unit acquires the image.

12. A terminal device comprising a display screen,
wherein the display screen comprises:
a display panel portion, configured to display an image based on input image data;
a transparent fixing component above the display panel portion, configured to protect the display panel portion;
a camera unit provided on a predetermined area of the display panel portion, configured to acquire an image; and
a processing unit configured to process the image acquired by the camera unit, and transmit the image to the display panel portion to display the image thereon,
wherein the camera unit comprises:
a blocking unit provided on the first area of an upper surface of the display panel portion, configured to block light rays emitted from the display panel portion;
a photo-sensitive unit provided on an upper surface of the blocking unit; and
a lens unit provided above the photo-sensitive unit, and
wherein the blocking unit comprises multiple openings configured to pass the light rays emitted from the display panel portion and the photo-sensitive unit is provided on an area on the upper surface of the blocking unit which is not provided with the openings.

13. A display screen, comprising:
a display panel;
a backlight unit provided at the back side of a display panel, wherein an opening is provided at a first area of the backlight unit;
a camera unit provided in the opening, configured to acquire an image of an object outside the display screen; and
a control unit configured to control the display panel, the backlight unit and the camera unit;
wherein, the control unit turns off the backlight unit every predetermined time intervals in the process of acquiring image by the camera unit;
the control unit controls at least an area that corresponds to the first area on the display panel to enter a transparent state, after the control unit turns off the backlight unit;
the control unit controls the camera unit to acquire the image, after at least the area corresponding to the first area on the display panel enters the transparent state; and
the control unit turns on the backlight unit, and controls the display panel to display the image based on the provided image signal, after the camera unit acquires the image.

14. The display screen of claim 13, wherein,
the predetermined time intervals is at least every other video frame.

15. The display screen of claim 13, wherein,
the control unit controls the display panel to enter a non-transparent state, after the image acquisition by the camera unit is finished and before the control unit turns on the backlight unit.

16. The display screen of claim 13, wherein, the display screen further comprises:
a surface polarizer provided at the front side of the display panel, wherein the surface polarizer is a polarizer with a high transmissivity.

17. The display screen of claim 13, wherein, the display screen further comprises:
an inner polarizer provided between the display panel and the backlight unit, wherein, the inner polarizer is a polarizer with a high transmissivity.

18. The display screen of claim 13, wherein, the display panel is formed of a low-black liquid crystal molecule material.

19. A method for controlling the display screen to acquire image, wherein the display screen comprises a display panel; a backlight unit provided at a back side of the display panel and a camera unit provided in a first area of the backlight unit, and the control method comprises:
turning off the backlight unit every predetermined time intervals in the process of acquiring image by the camera unit;
controlling at least an area that corresponds to the first area on the display panel to enter a transparent state, after the control unit turns off the backlight unit;
controlling the camera unit to acquire an image, after at least the area corresponding to the first area on the display panel enters the transparent state; and
turning on the backlight unit, and controls the display panel to display the image based on the provided image signal, after the camera unit acquires the image.

20. The method of claim 19, further comprising:
controlling the display panel to enter a non-transparent state, after the image acquisition by the camera unit is finished and before the control unit turns on the backlight unit.

21. A terminal device, comprising:
a display screen, comprising:
a display panel;
a backlight unit provided at a back side of the display panel, wherein, an opening is provided on a first area of the backlight unit;
a camera unit provided in the opening, configured to acquire an image of an object outside the display screen;
a processing unit configured to control the display panel, the backlight unit and the camera unit, and configured to process the image acquired by the camera unit, and transmit the image to the display screen to display thereon;
wherein, the processing unit turns off the backlight unit every predetermined time intervals in the process of acquiring image by the camera unit;
the processing unit controls at least an area that corresponds to the first area on the display panel to enter a transparent state, after the processing unit turns off the backlight unit;
the processing unit controls the camera unit to acquire the image, after at least the area corresponding to the first area on the display panel enters the transparent state; and
the processing unit turns on the backlight unit, and controls the display panel to display the image based on the provided image signal, after the camera unit acquires the image.

* * * * *